July 4, 1933.  K. HENTSCHKE ET AL  1,917,116

FLUID DISTRIBUTOR DEVICE FOR FLUID DRIVING GEARS

Filed July 8, 1931  2 Sheets-Sheet 1

Inventors:
Karl Hentschke
Otto vom Bovert
By
Blair & Kilcoyne
ATTYS.

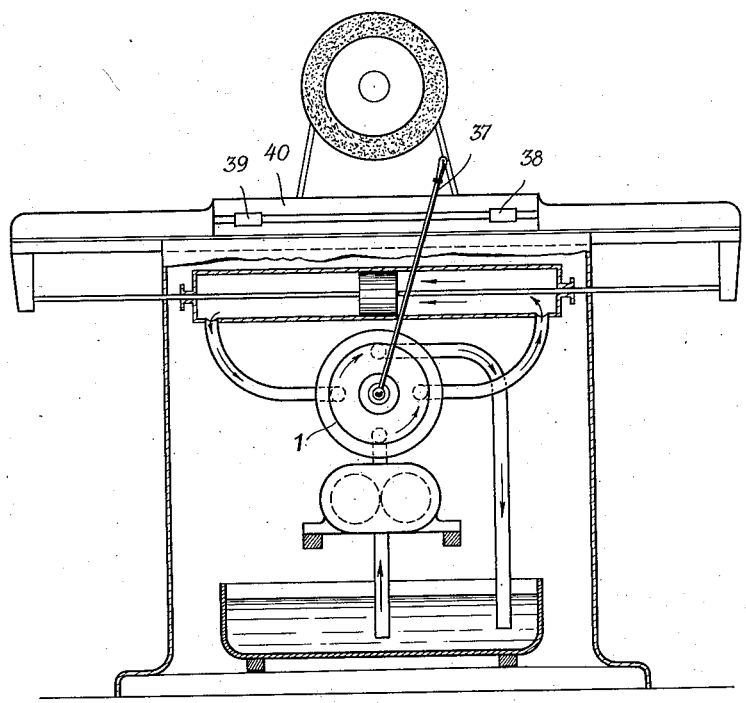

Patented July 4, 1933

1,917,116

UNITED STATES PATENT OFFICE

KARL HENTSCHKE, OF BERLIN-CHARLOTTENBURG, AND OTTO VOM BOVERT, OF DRESDEN, GERMANY, ASSIGNORS, BY MESNE ASSIGNMENTS, TO SAMSONWERK G. M. B. H., OF BERLIN, GERMANY

FLUID DISTRIBUTOR DEVICE FOR FLUID DRIVING GEARS

Application filed July 8, 1931, Serial No. 549,476, and in Germany July 12, 1930.

The invention relates to a controlling device of valve for hydraulic driving gears which are particularly intended for the table drive of machine tools.

The object of the invention is the provision of a device for use in connection with machines and particularly reversing drive motors for machine tools to control the movement of the reversing drive motors and the traveling carriage carried thereby.

A further object of the invention is the provision of a control device of the above character in which the control motor and valve member for regulating the carriage actuating mechanism is housed within the same casing. An important advantage of this arrangement over the hitherto known control devices is manifest in the small amount of power required to operate the same, as the valve member moves freely during rotation and is in no direction loaded by the driving mechanism of the machine.

A further important object of the invention is the provision of a control device which can be incorporated as a complete unit with existing machine tools having hydraulic drive and may be readily installed on the same either before or after such tools are assembled.

A further object of the invention is the provision of a control device which, in addition to the advantage of being a unit capable of installation as such, is simple in construction, cheap to manufacture, and efficient and dependable in operation, thus fulfilling the long-felt need of those interested in the art to which it is applicable.

Briefly, the invention consist of a pot-like casing within which are disposed a plurality of conduits for a fluid drive medium. Within the casing is a valve member, also having conduits, and which is coaxially connected with a vane type control motor occupying a space provided by an extension of the pot-like casing. A sleeve member having a plurality of conduits is mounted on the extension and has a lever connected thereto adapted to be actuated by the traveling carriage of a reversing drive motor with which the invention is particularly adapted to be associated, whereby the respective conduits are brought into appropriate registry to reverse the flow of the driving medium and therefore the driving motor and traveling carriage.

Control devices which consist of a control motor driving the valve for the table-drive motor, which is controlled by projections arranged on the table through the oscillating of a valve are known in themselves. It is further known to connect the control motor coaxially with the valve and to construct the control motor as a vane piston.

However, the combination of the known features of the construction of the motor as a vane piston and the coaxial arrangement of the valve and control motor with the feature, not known in itself, of the housing of these parts in a pot-like casing which is capable of being fitted as a whole, is new.

Other objects will be in part obvious from the annexed drawings and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as part of this disclosure, and in such drawings like characters of reference denote corresponding parts throughout all of the views, of which—

Fig. 5 is an organization view.

Figure 3:
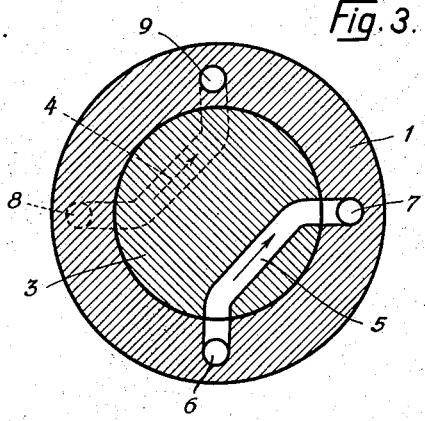
Fig. 3 is a section on the line 3—3 of Fig. 1.

Referring now to the drawings, numeral 1 indicates a pot-like casing having a projecting cylindrical extension lying adjacent the fastening flange on which the actuating device, e. g., the control sleeve 2 can swing. In the interior of the pot-like casing 1 the valve 3 is arranged, which is penetrated by conduits 4, 5 (Fig. 3).

The pressure fluid enters the casing 1 of the control device through the inlet conduit 6 and reaches, through the channel 5, a port 7 which conducts the pressure fluid to the driving motor (see Fig. 5) for the reciprocating motion of the machine tool.

At the same time the fluid situated in front of the piston of the driving motor flows through the connecting port 8 in the casing 1 of the control device through the conduit 4 to an exit conduit 9 and from there back to the pressure fluid container.

The valve 3 has rigidly connected with it a cylindrical extension of smaller diameter than that of the part through which pass the conduits 4 and 5 and on which a vane 10 is fixed. The vane acts as a piston on being acted upon by the pressure-liquid and is able to oscillate with the valve 3 in an annular space 11 which is formed by the cylindrical part of the casing 1, on which the control sleeve 2 is arranged. The movement of the vane 10, and therefore of the valve 3, is limited by a partition wall 12.

Figure 2:
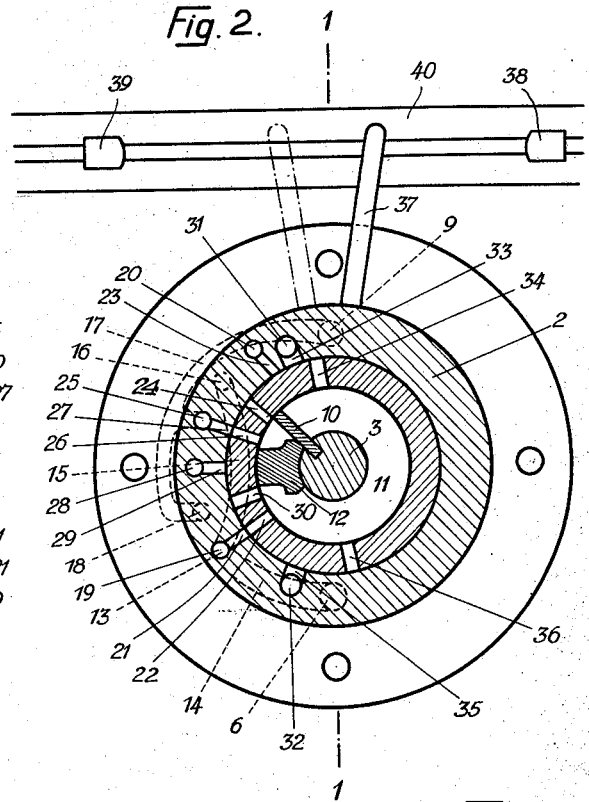
Fig. 2 is a cross-section on the line 2—2 of Fig. 1.
Figure 4:
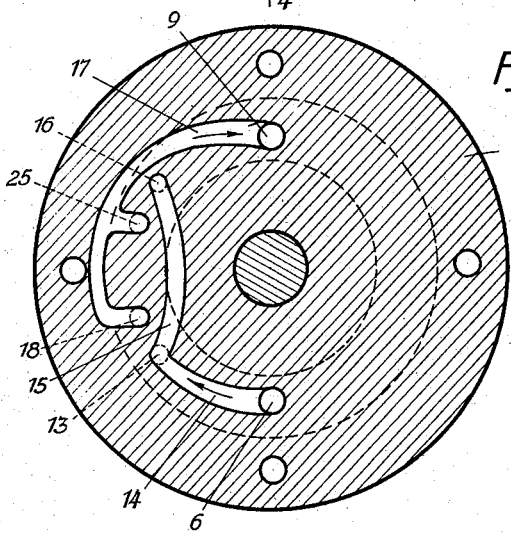
Fig. 4 is a section on the line 4—4 of Fig. 1.

A number of longitudinal channels are arranged in the control sleeve 2 which on a suitable movement of the control sleeve can be brought opposite corresponding openings in the casing 1 of the control device (Figs. 2 and 4).

The opening 13 of the openings referred to in the casing 1 is connected by a conduit 14 arranged in the casing, with the inlet conduit 6. A continuation 15 of the conduit 14 leads from the opening 13 to an opening 16 in the casing 1.

A conduit 17 leads from the exit conduit 9 in the casing 1 to an opening 18 arranged in the casing.

According to the position of the control sleeve either, as with the position of the parts according to Figure 2, the channel 19 lies opposite the opening 13, or, if the control sleeve is correspondingly turned anti-clockwise, the channel 20 lies opposite to the opening 16.

Through the radial tapping 21 connecting with the channel 19, pressure fluid can reach, as shown by the position of the control sleeve in Figure 2, a radial passage 22 in the cylindrical extension of the casing of the control device by way of 6, 14, 13, 19, and from there the pressure space 11.

If the control sleeve is so turned that the channel 20 lies opposite the opening 16, then the pressure fluid can likewise reach the pressure space 11 by way of 6, 14, 15, 16, 20, through a radial tapping 23 out of the channel 20, and a radial passage 24 arranged in the cylindrical extension of the casing of the control device. In this case, the vane 10 and therefore the control motor valve 3 are moved in the reverse direction.

In order to make possible the exit of the pressure fluid situated in front of the vane 10 there serves, in the position of the control sleeve in Figure 2, an opening 25 leading directly into the conduit 17 arranged in the casing 1. The annular space 11 is shown connected with the conduit 17 by the radial passage 26 of the cylindrical extension of the casing 1 and a radial tapping 27 and the opening 25 in the control sleeve.

In the position of the distributor sleeve represented in Figure 2, the pressure medium enters the annular space 11 through the radial passage 22 and turns the valve 3 round anti-clockwise by acting on the vane 10 of the control motor. The pressure fluid lying in front of the vane 10 exits through the passage 26 in the cylindrical extension of the casing 1. The channel 25 is connected with the conduit 17 arranged to lead directly to the pressure fluid container.

If the control sleeve 2 is so turned anti-clockwise so that the channel 20 comes opposite the opening 16 and the radial tapping 23 opposite the radial passage 24, then a channel 28 arranged in the control sleeve 2 comes opposite the opening 18. From the channel 28 there extends a radial tapping 29, which then comes opposite a radial passage 30 in the cylindrical extension of the casing 1, so that the annular space 11 is connected with the exit conduit 9 by the path 30, 29, 28, 18, 17.

Further channels 31, 32 are arranged in the control sleeve 2, which lead directly into the open. If the control sleeve 2 is rotated clockwise out of its position shown in Figure 2, then the channel 31 of the distributor sleeve leading to the open comes by way of a radial tapping 33 opposite a radial passage 34 in the cylindrical extension of the casing 1. Likewise by motion in the other direction the channel 32 leading to the open is brought opposite a radial passage 36 in the cylindrical extension of the casing 1, by way of a radial tapping 35.

A lever 37 is fastened on the control sleeve 2 and can be shifted from the position shown in full lines in Figure 2 into the position shown in dot-and-dash lines and reversely by the projections 38, 39 on the reciprocated table 40 of the machine, e. g. the slide (see Fig. 5).

The operation of the distributor device is as follows:—

Figure 1:
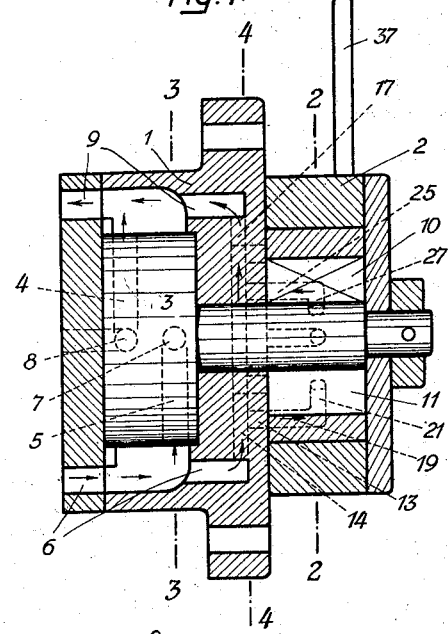
Fig. 1 is an axial longitudinal section through the control device on the line 1—1 of Fig. 2.

In the position of the parts in Figures 1 to 3, pressure medium reaches the fluid motor (see Fig. 5) which operates the part 40, through the inlet conduit 6 and by way of the conduit 5 in the valve member 3 and the connecting port 7 in the casing 1. From the motor the pressure fluid passes through the port 8 and the conduit 4 in the valve member to the exit conduit 9. When as a result of the movement of the part 40 to the left the projection 38 makes contact with the lever 37 and shifts it on further movement of the part 40 into the position indicated in dot-and-dash lines in Figure 2 thereby turning the control sleeve 2 round anti-clockwise so that the channel 28 in the control sleeve 2 comes over the opening 18 in the casing 1 and the channel 20 in the control sleeve 2 over the opening 16 in the casing 1. The pressure fluid then flows from the inlet conduit 6 through the conduit 14, the branch conduit 15, the opening 16, the channel 20, the radial tapping 23 and the radial passage 24 into the annular space 11 and acts on the vane 10, which then moves round clockwise until it comes against the partition wall 12.

The pressure fluid situated in front of the vane in the annular space 11 passes through the radial passage 30 in the casing 1 of the control device, the radial tapping 29, the channel 28, the opening 18, into the channel 17 leading to the exit conduit 9.

On the movement of the vane 10 the valve 3 connected thereto is taken with it, so that the conduits 4 and 5 arranged in the valve 3 are moved accordingly. In the constructional form illustrated in Figure 2, the vane 10 comes to rest after a rotation of 270°. Then the connecting port 7 in the casing 1 is connected with the exit conduit 9 by the conduit 5 and the connecting port 8 in the casing connected with the inlet conduit 6 by way of the conduit 4. As in this manner the inlet and outlet sides of the fluid motor are reversed, it is driven in the reverse direction and the part 40 moved back.

As soon as the projection 39 on the part 40 pushes the lever 37 of the control sleeve 2, the lever moves it from the position indicated in dot-and-dash lines in Figure 2 into the position indicated in that figure in full lines and thereby brings the control sleeve again into the position of Figure 2.

In this position the pressure medium enters from the inlet conduit 6 through the opening 13 and channel 19 which are opposite one another and the radial trappings 21, 22, into the annular space 11 and acts on the vane 10 and turns it and therefore the valve 3 round anti-clockwise about 270° until, as shown in Figure 2, it lies against the partition wall 12. Then the inlet conduit 6 is again connected with the port 7 by the conduit 5 in the valve 3 and the connecting opening 8 is brought into connection with the exit conduit 9 by the conduit 4 in the valve 3. The direction of motion of the motor is thereby again reversed into its original direction.

If the part 40 reciprocated by the fluid motor is to become stationary, then the control sleeve is rotated by hand beyond the amount of its movement by the projections 38 or 39.

By turning the control sleeve 2 clockwise the channel 25 of the control sleeve 2 comes opposite the opening 16 in the casing 1 of the control device. In this position the radial tappings 27 and the radial passage 24 come opposite one another, so that the pressure fluid passes out of the inlet conduit 6 by way of the conduits 14 and 15 into the annular space 11 and is able to turn the vane round clockwise. The valve 3 is thereby turned and the supply of fluid to the fluid motor cut off. In this position of the control sleeve the radial tapping 33 of the control sleeve comes opposite the radial passage 34 so that after the vane has passed over the end of the passage 34 the fluid entering through the radial passage 24 passes by way of the radial tapping 33 into the exit channel 31, and the vane 10, which is now no longer acted upon, remains stationary.

In the same way stopping is effected if the control sleeve 2 is turned round to the left so far that the radial tapping 35 comes opposite the radial passage 36.

If in a machine several independent parts, e. g. several slides or supports, e. g. for the table longitudinal motion and the cross-feeding motion are to be controlled, then it is sufficient to provide several passages in the distributor member for the controlling of the driving motor. There could also be provided several distributor members which are arranged either coaxially or in the adjacent or superimposed planes.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

We claim:—

1. In a device of the character described including in combination with a reversing drive motor having a traveling carriage, a control device comprising a casing having an extension, a sleeve member mounted for oscillation on said extension, said casing and sleeve member having respectively a plurality of conduits for a fluid driving medium, a valve member mounted for oscillation within said casing and having a plurality of conduits for a fluid driving medium, a vane-type motor mounted for oscillation within the extension of the casing and coaxially connected to said valve member, a lever carried by the aforesaid sleeve member, stop members carried by the carriage and respectively adapted to coact with said lever upon engagement therewith at the end of the path of travel of said carriage to bring said conduits into respective selected registry with each other to reverse the flow of said fluid driving medium whereby the motor is reversed.

2. In a device of the character described including in combination with a reversing drive motor having a traveling carriage a control device comprising a casing having an extension, a sleeve member mounted for oscillation on said extension, said casing and sleeve member having respectively a plurality of conduits for a fluid driving medium, a valve member mounted for oscillation within said casing and having a plurality of conduits for a fluid driving medium, a vane-type motor mounted for oscillation within the extension of the casing and coaxially connected to said valve member, a lever carried by the aforesaid sleeve member, stop members carried by the carriage and respectively adapted to coact with said lever upon engagement therewith at the end of the path of travel of said carriage to bring said conduits into respective selected registry with each other to reverse the flow of said fluid driving medium whereby the motor is reversed, and conduits in said casing and sleeve members adapted to vent said motor upon movement of the sleeve member to a predetermined point beyond the end of the path over which it is reciprocated by said stop members.

3. In a control device of the character described including in combination with a reversing drive motor a control device comprising a casing having a flange and an extension, a sleeve member mounted for oscillation on said casing, said casing and sleeve member having respectively a plurality of conduits for a driving medium, a valve member mounted for oscillation within said casing and having a plurality of conduits for a fluid driving medium, a vane-type motor mounted for oscillation within the extension of the casing and coaxially connected to said valve member, a lever carried by the aforesaid sleeve member, stop members carried by the carriage and respectively adapted to coact with said lever upon engagement therewith at the end of the path of travel of said carriage to bring said conduits into respective selected registry with each other to reverse the flow of said fluid driving medium whereby the motor is reversed, and conduits in said casing and sleeve members adapted to vent said motor upon movement of the sleeve member to a predetermined point beyond the end of the path over which it is reciprocated by said stop members.

In testimony whereof we affix our signatures.

KARL HENTSCHKE.
OTTO VOM BOVERT.